United States Patent [19]
Smith

[11] 3,798,983

[45] Mar. 26, 1974

[54] ADAPTABLE GEAR HOUSING FOR LINEAR ACTUATOR CONSTRUCTION

[76] Inventor: William F. Smith, 2295 Lorain Rd., San Marino, Calif. 91108

[22] Filed: May 15, 1972

[21] Appl. No.: 253,551

[52] U.S. Cl. .............................................. 74/89.15
[51] Int. Cl. ............................................ F16h 27/02
[58] Field of Search.. 74/89.15, 89.14, 425, 424.8 R

[56] References Cited
UNITED STATES PATENTS

| | | | |
|---|---|---|---|
| 2,344,594 | 3/1944 | Bryant | 74/89.14 |
| 2,724,978 | 11/1955 | Morrell | 74/424.8 VA |
| 2,306,723 | 12/1942 | Floraday | 74/89.14 |
| 3,398,484 | 8/1968 | Katsumura et al. | 74/89.15 |
| 3,523,599 | 8/1970 | Denkowski | 74/425 |

Primary Examiner—Benjamin W. Wyche
Assistant Examiner—Wesley S. Ratliff, Jr.

[57] ABSTRACT

A universal worm gear box capable of multiple selection assembly and gear ratios from a small number of components, wherein there is a hollow worm-rotated hub to drivingly receive a screw shaft in selective position and motion relationship to the hollow hub and a screw follower nut, and means for selectively attaching various anchoring or connecting linkages in different combinations and in different indexed positions of rotation about the longitudinal axis of the hollow hub.

1 Claim, 8 Drawing Figures

ADAPTABLE GEAR HOUSING FOR LINEAR ACTUATOR CONSTRUCTION

The invention relates to a worm gear box and to the box as part of a quite flexible or universal combination of elements of which the gear box or housing is the heart. The device is intended for use in combination with a screw shaft to provide a jack-like linear actuator for raising and lowering and otherwise moving heavy structures or portions thereof.

Devices of this general type have been known for many years. In general they comprise a housing in which is a screw shaft and a nut for the shaft, with a worm and a worm gear for rotating the screw shaft to reciprocally move structures which, for example, might weight from 1,000 lbs. to 100,000 lbs. The devices heretofore however have all been made with specific gear ratios, depending upon the particular job application and weight involved. Furthermore, prior devices have been manufactured in such a way that the gear box or housing has been capable of mounting only in a specific manner, affording no degree of flexibility of mounting or coupling. Thus, the assembly for a particular installation might often be made up to order and adaptable for a specific use and no other.

It is an object of the present invention to provide a worm gear box wherein the worm and the gear can be manufactured and stocked to provide a number of different gear ratios selectively mountable in a standard housing so that a relatively small stock or worms and gears can be maintained to satisfy a rather wide range of weights to be elevated or shifted.

Another object is to provide a device having a gear box or housing with attachment means for securing different types of anchoring members or connecting linkages and wherein said anchoring members or connecting linkages can be secured in a multiple of positions to render the apparatus adaptable for mounting or connecting in different positions and environments.

Another object is to provide a gear box or housing in combination with a screw shaft and a screw follower or nut wherein the box or housing is provided with a universal support in the form of a worm driven hollow hub which is capable of receiving and supporting the screw shaft in different positions and relationships to provide, in effect, different types of operating mechanisms.

A further object is to provide a device of the type described wherein the screw shaft nut can be mounted in an axially fixed position but rotatable with the hollow hub so that the screw shaft will be moved axially, or wherein the nut can be mounted on the screw shaft and arranged to move along the screw shaft when the latter is rotated and wherein the nut engages some element for movement of the element longitudinally with respect to the axis of the screw shaft.

Still a further object is to provide a gear box of the type described with a hollow hub extending through the gear box or housing and the interior of the housing is sealed to retain the lubricant, the seal being located between portions of the housing and end portions of the hollow hub.

The above and other objects will more fully appear from the following description in connection with the accompanying drawings.

Figure 1:
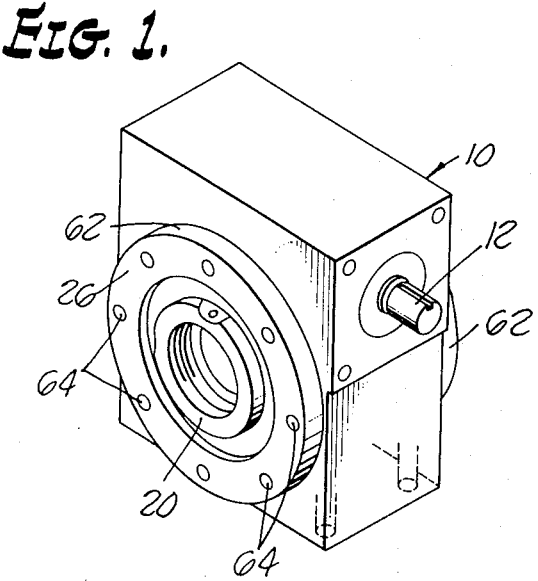
FIG. 1 is a perspective view of a gear box embodying the invention.

The basic element of my invention comprises a gear box or housing 10 having a worm shaft 12 suitably rotatably mounted therein and adapted to be connected by a coupling, gearing or other suitable means to a motor to be driven thereby. The worm shaft 12 has a worm thread 14 formed thereon in a conventional manner and the shaft and its worm 14 will be referred to hereinafter as the worm.

The worm 14 is meshed with suitable teeth 16 formed about a ring-like worm gear 18 to be rotated by said worm 14. Worm gear 18 is mounted about the medial portion of a hollow hub 20 and is adapted to drive said hub 20 through the medium of a key 22 which connects the worm gear and hub together.

Figure 2:
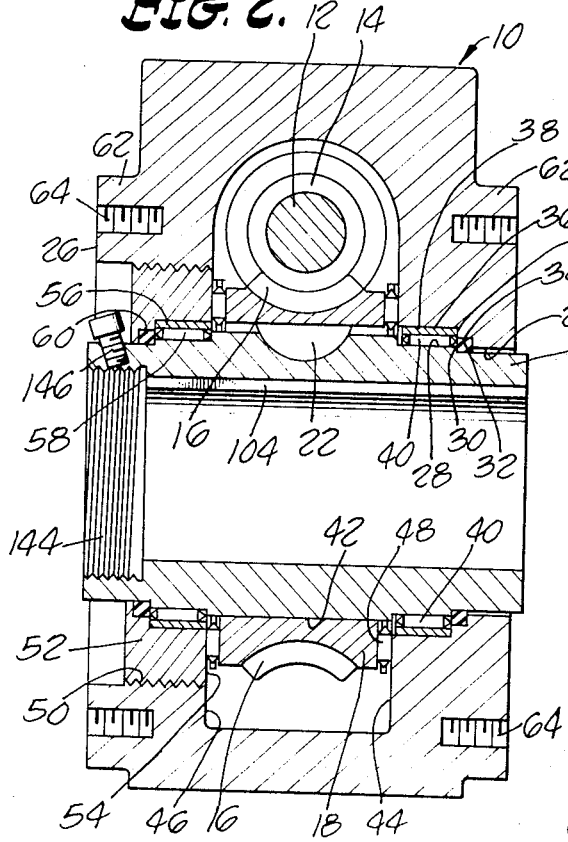
FIG. 2 is an enlarged vertical sectional view through the structure of FIG. 1, on an enlarged scale.

The hollow hub 20, as shown in FIG. 2, extends through the gear box or housing 10 from one flat side face 24 to an opposite flat side face 26, said side faces preferably being parallel.

The hollow hub 20 extends inwardly from the flat side face 24 of the gear box through a circular opening 25 and is provided with an enlargment 28 producing a shoulder 30 with which an O-ring seal 32 is in contact, said seal being also located in a cooperating chamfer 34. Inwardly from the seal 32 the housing is enlarged at 36 and provided with a bearing sleeve 38. Between said bearing sleeve and the enlarged portion 28 of the hollow hub 20 are suitable needle bearings 40 comprising a radial bearing assembly. Inwardly from the bearings 40 the hollow hub 20 is enlarged as at 42 to the diameter upon which the worm gear 18 is fitted. The inner portion of the housing 10 is provided with opposed inner side walls 44 and 46. Between the side wall 44 and one side of the worm gear 18 are needle bearings 48 which comprise a thrust bearing assembly.

On the opposite side of the worm gear 18 the housing 10 is provided with a threaded enlargment 50 to threadedly receive a retaining ring 52, which when removed permits the hollow hub 20 and the ring gear 18 to be removed from the housing from right to left, as viewed in FIG. 2. The inner wall 54 of the threaded ring 52 is preferably coincident with the inner wall 46 of the gear box or housing and between the walls 54 and 46 are needle bearings 56 comprising a thrust bearing assembly similar to that on the first described side of the ring gear 18.

Around the inside of the threaded retainer ring 52 is a bearing sleeve 56 similar to bearing sleeve 38 and the left side of the unit as viewed in FIG. 2 is provided with radial bearings 58 and a sleeve O-ring 60 in the same manner as the needle bearings 40 and O-ring 32.

Figure 3:
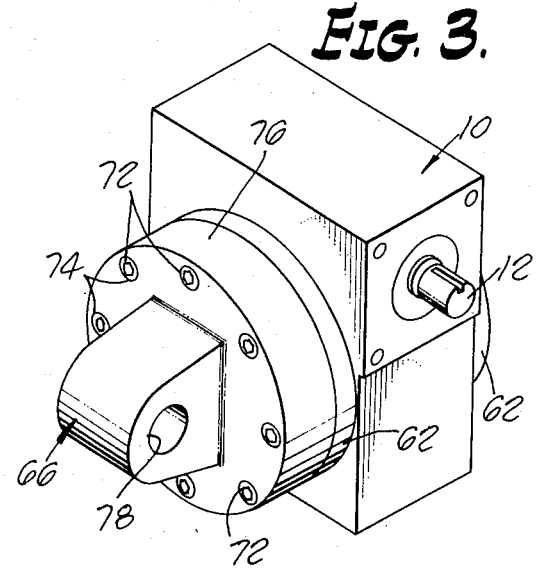
FIG. 3 is a perspective view similar to FIG. 1 with a female trunnion mounted on the gear box.

Each of the flat side faces 24 and 26 of the gear box or housing 10 is formed on a boss 62 which is formed integrally with the housing and lies about the opening through the housing for the accommodation of the hollow hub 20. Disposed about each boss 62 and extending inwardly from each flat side face 24 and 26 are equally spaced threaded holes 64 which are also equally spaced radially from the longitudinal axis of the hollow hub 20. Either of the flat side faces 24 and 26 is adapted to be connected selectively with one of a number of attachments, such as the female trunnion 66 of FIG. 3, the male trunnion 68 of FIG. 4, or the mounting plate 82 of FIG. 5. The female trunnion 66 is shown in FIG. 3 to be secured by studs 72 which extend through suitable holes 74 in a trunnion flange 76. The holes 74 in the flange 76 are equal in number and location to the threaded holes 64 in the flat side faces 26 and 24 of the gear box or housing 10.

Figure 4:
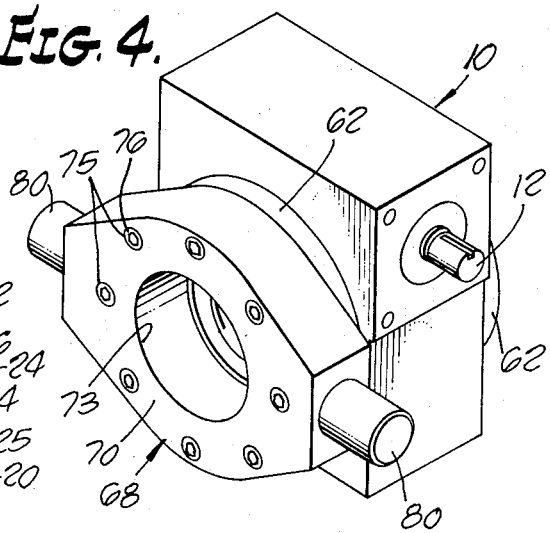
FIG. 4 is a view similar to FIG. 1 with a male trunnion mounted on the gear box.

The male trunnion 68 of FIG. 4 has a body portion 70 with a central aperture 73 at least equal in diameter to the aperture 50 in the left flat side face 26 of said housing. The trunnion body 70 is provided with a series of holes 75 through which extend studs 76 which are threaded into the threaded holes 64 of the flat side face of the housing on the boss 62. The female trunnion 66 of course has a circular opening 78 therethrough which preferably is normal to the axis of the hollow hub 20 and the male trunnion 68 comprises duplicate cylindrical portions 80.

Figure 8:
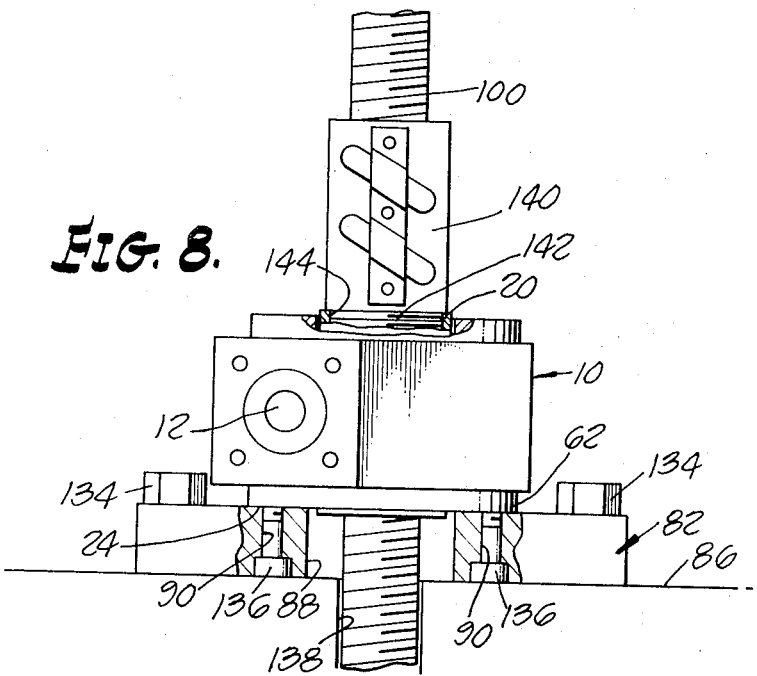
FIG. 8 is a view partially in side elevation and partially in vertical section of another form of mounting the gear box or housing and the screw shaft and nut.

The mounting plate 82 has holes 84 in its four corners by means of which it can be attached to a suitable support indicated at 86 in FIG. 8. Said mounting plate has a central aperture 88 similar to the aperture 72 in the male trunnion body 70. The mounting plate 82 also is provided with a series of holes 90 about the central opening 88 and arranged to coincide with the holes 64 in the flat side faces 24 and 26 of the gear box or housing 10. The holes 90 in the mounting plate are adapted to receive studs which can be threaded into the threaded holes 64 of the gear box side faces in the same manner as the studs 72 and 76 of the embodiments of FIGS. 3 and 4.

Figure 5:
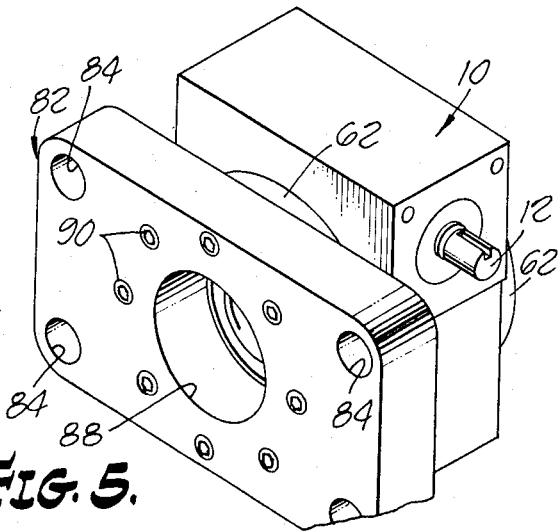
FIG. 5 is a view similar to FIG. 1 with an anchoring plate mounted in place of the female and male trunnions of FIGS. 3 and 4 respectively.

In the embodiments of FIGS. 3, 4 and 5, since the stud openings of each of the trunnions and the mounting plate are equally spaced about and from the longitudinal axis of the hollow hub 20, in the same manner as the threaded holes 64 in the side faces of the housing 18, the female and male trunnions and the mounting plate can be shifted to different rotated or indexed positions about the longitudinal axis of said hollow hub 20. This affords a great deal of flexibility in the mounting of the gear box to bring the longitudinal axis of the hollow hub 20 to different desired positions to accommodate different mounting and operating requirements. For example in FIG. 3, the opening 78 in the female trunnion 66 has its longutidinal axis parallel to the longitudinal axis of the worm 12. By shifting the trunnion relative to the housing 10, the longitudinal axis of the opening 78 can be located in different angular positions relative to the axis of the worm 12, the number of positions being limited only by the number of threaded holes 64 in the flat side faces of the housing and the complementary and equally numbered holes in the trunnion flange 76.

In the same manner the male trunnion unit 68 can be located in different indexed positions and the mounting plate 82 of FIG. 5 can be likewise selectively located. This extreme flexibility of mounting structures and positions makes it possible to provide a device capable of many different types of installations requiring different positional relationships without requiring that the assembly be made to order or without the necessity of maintaining a much larger supply of stock parts than would be required with my device.

Figure 6:
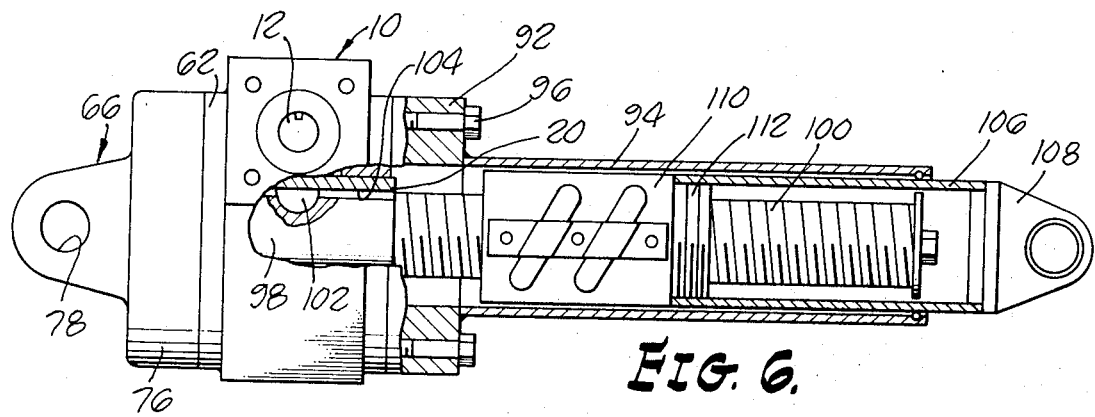
FIG. 6 is a view partially in side elevation and partially in longitudinally vertical section through an adaptation of the gear box or housing to one accessory or attachment arrangement.

In FIG. 6 the housing 10 is shown with one of the female trunnions 66 mounted on the left side thereof. Mounted on the right side is a base 92 for a sleeve 94, the base being secured by studs 96 mounted in the threaded holes 64 on the right side of the housing 10. Located in the hollow hub 20 is the smooth end 98 of a screw shaft 100, the smooth end 98 of said shaft being connected to the hollow hub for rotation by a key 102 in a keyway 104 extending longitudinally in the inner wall of the hollow hub 20. The screw shaft 100 extends through the interior of the sleeve 94 and into an inner telescoping sleeve 106 which may have any suitable type of connecting device, such as trunnion 108, of a desired type thereon for connecting with a suitable structure to be raised, lowered or otherwise moved. Movement of the inner telescoping sleeve 106 is accomplished by a nut 110 having a portion 112 threaded into the end of the sleeve 106, said nut having suitable threads (not shown) engaging the threads of the screw shaft 100 so that said nut will move along the shaft and carry the inner telescoping sleeve with it. The nut 110 is held against rotation when the trunnion 108 is secured to an object to be operated since the trunnion cannot rotate about the longitudinal axis of the screw shaft 100 and consequently the inner telescoping sleeve 106 and nut 110 will be held against rotation. For that reason rotation of the screw shaft 100 will cause the nut, sleeve 106 and trunnion to move longitudinally of the screw shaft.

The nut 110 is illustrated in a conventional manner to indicate a ball nut wherein a series of contained balls in an endless circuit are arranged to lie in and follow the thread of the screw shaft 100. This is a conventional type of structure which is not shown since it is well known in the art.

Figure 7:
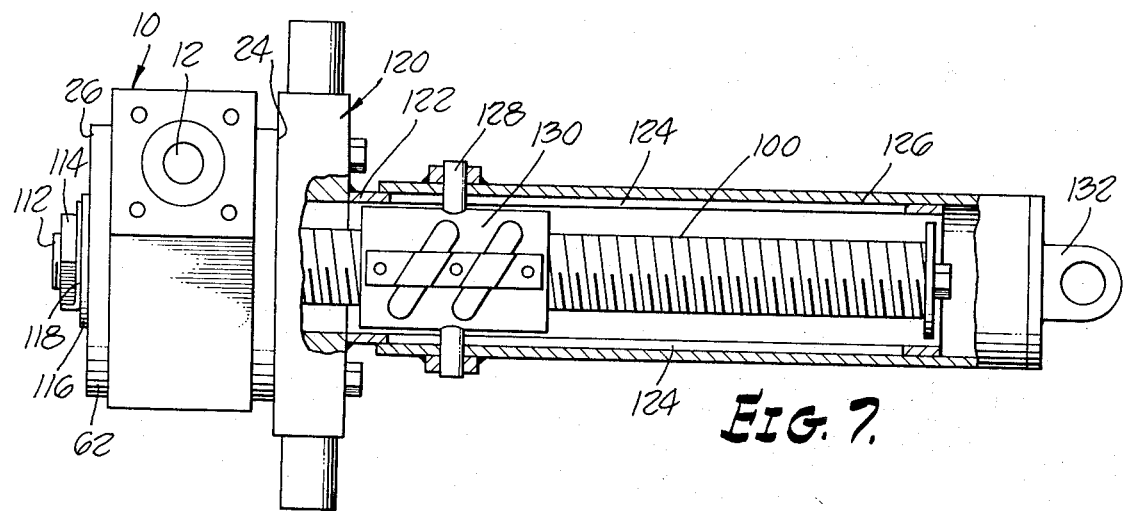
FIG. 7 is a view similar to FIG. 6 with a different attachment assembly.

FIG. 7 shows an arrangement wherein the left end 112 of the screw shaft 100 is reduced and threaded at the extreme end 112 to receive a nut 114 and a washer 116. A nut locking washer 118 may be provided if desired. In this figure the right flat side face 24 of the housing 10 has a male trunnion unit 120 mounted thereon and welded to the face of said male trunnion unit is a sleeve 122 having slots 124 through a major portion of its length. Telescopically sliding on the sleeve 122 is an outer sleeve 126 having pins 128 radially mounted therethrough and extending respectively through the slots 124 and suitably secured to a nut 130 similar to the nut 110 of FIG. 6. Rotation of the screw 110 with the hollow hub 120 causes the nut to move longitudinally on the screw shaft 100, carrying with it the outer telescoping sleeve 126 which may have a suitable connector, such as female trunnion 132 thereon.

In the embodiment of FIG. 7 the telescoping sleeves are reversed insofar as the stationary and movable sleeves are concerned. Furthermore, it is important to note that the gear box or housing 10 is supported for pivotal movement by the trunnion 120 which lies between the housing 10 and the outwardly extending portions of the screw shaft 100 and the sleeves 122 and 126. This distinguishes from the embodiment of FIG. 6 where the trunnion 66 is located on the opposite side of the gear box or housing 10 from the outwardly extending portion of the screw shaft 100.

In FIG. 8 there is shown the gear box 10 in a position 90° from those of FIGS. 6 and 7 and also from the position of FIG. 2. In this figure the base plate 82 is secured to a base 86 by studs 134 and the base plate is secured to the downwardly disposed "side face" of the gear box or housing by studs 136 which correspond to the studs 72 and 76 of FIGS. 3 and 4. The screw shaft 100 is vertically disposed and extends through both sides of the gear box or housing 10. The lower end of said screw shaft being extended downwardly through a suitable opening 138 in the supporting member 86. In this embodiment there is a screw follower or nut 140 having a threaded end 142 which is mounted in the internally threaded enlargment 144 in the left end of the hollow hub 20 as shown in FIG. 2. Also shown in FIG. 2 is a set screw 146 which can be used to engage and secure the threaded end 142 of the nut 140. Thus, the screw shaft 110 will move axially in a direction through the gear box or housing 10 to perform any desired work determined by a particular need.

For the sake of uniformity in reciting certain parts of the device in the several embodiments insofar as the claims are concerned the screw shafts and their nuts or followers are given a broader term, namely rotary-to-linear motion conversion means. Also the trunnions 66 and 68 of FIGS. 3 and 4 and the mounting plate 82 of FIG. 5 may be designated anchor members.

From the foregoing it will be seen that I have provided a gear box or housing for a worm drive adapted to move a screw shaft relative to a nut or vice-versa for performing heavy work where relatively linear limited movement is required. The device is so constructed that it can, with a great deal of flexibility and ease, be provided with different types of connectors, such as trunnions and mounting plates on either side of the gear box to suit different environmental situations. Furthermore, the connecting elements, such as trunnions, etc., can be indexed in position about the longitudinal axis of a hollow hub extending through the gear box. Various means can be utilized for movement by the screw or nut, such as illustrated in FIGS. 6 and 7. This is all accomplished with a relatively simple yet highly flexible construction which permits numerous adaptations of the basic unit and which provides a number of different assemblies, all with a comparatively small number of component parts.

The hollow hub feature is quite important since it provides means for permitting the screw to be mounted therein at one end of the screw with a movable screw follower or nut or which permits the screw shaft to extend through the hub and to be moved axially therein by a suitable stationary screw follower or nut conveniently carried by the end of the hollow hub.

Furthermore, the gear box or housing itself by reason of the identical flat side faces 24 and 26 with their identically spaced and located threaded holes 64 constitute a basic unit permitting the various mountings, such as trunnions, etc., mentioned above.

A relatively small number of component parts can be made up in several more or less standardized sizes and shapes, including worms and worm gears of several different ratios, and assemblies can be equally and easily put together to suit a number of different conditions dictated by positional location of the device, and size and power capabilities of the assembly.

It should of course be understood that various changes can be made in the form, details, arrangement and proportions of the various parts without departing from the spirit of the invention.

I claim:

1. A universal gear box system for converting rotary movement to linear forces wherein the improvement comprises a gear box including a housing having opposite open side portions and having rotary-to-linear motion conversion means therein, the housing having a hollow rotary hub for the reception of and driving connection with said rotary-to-linear conversion means extending through at least one of said opposite open side portions, the housing having opposite flat faces about said open side portions with a plurality of arrangements of securing means equally spaced about each of the open side portions, and anchor members for opposing said linear forces having securing means complementary to the securing means of said open side portions and releasably securable thereto on either side of the housing in selected positions rotationally about the open side portions, said anchor members having means independent of their securing means for mounting the anchor members and gear box housing against transitional movement.

* * * * *